(12) United States Patent
Tokimasa et al.

(10) Patent No.: US 10,766,488 B2
(45) Date of Patent: Sep. 8, 2020

(54) DRIVING CONTROL DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mitsuhiro Tokimasa, Kariya (JP); Takuma Sudo, Kariya (JP); Takashi Maeda, Nagoya (JP); Naoki Kusumoto, Okazaki (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 293 days.

(21) Appl. No.: 15/849,235

(22) Filed: Dec. 20, 2017

(65) Prior Publication Data
US 2018/0178793 A1    Jun. 28, 2018

(30) Foreign Application Priority Data
Dec. 26, 2016   (JP) .................................. 2016-250803

(51) Int. Cl.
*G05D 1/00*     (2006.01)
*B60W 30/16*    (2020.01)
(Continued)

(52) U.S. Cl.
CPC ............ *B60W 30/16* (2013.01); *B60W 30/09* (2013.01); *B60W 30/165* (2013.01); *G01S 7/415* (2013.01);
(Continued)

(58) Field of Classification Search
None
See application file for complete search history.

(56) References Cited

U.S. PATENT DOCUMENTS 5,805,103 A  *  9/1998  Doi ....................... G01S 13/931
                                                    342/70
6,345,227 B1 *  2/2002  Egawa .................. B60W 30/16
                                                    701/96
(Continued)

FOREIGN PATENT DOCUMENTS

| JP | 2000-108719 A | 4/2000 |
| JP | 2000-168521 A | 6/2000 |
| JP | 2007-237966 A | 9/2007 |

*Primary Examiner* — Jonathan M Dager
(74) *Attorney, Agent, or Firm* — Maschoff Brennan

(57) ABSTRACT

A driving control device has a target-following driving control part performing a target-following driving control of a preceding vehicle in front of a vehicle, and a target acceleration setting part setting a target acceleration/deceleration of the vehicle to maintain a inter-vehicle distance between the vehicle and the preceding vehicle within a target inter-vehicle distance during the target-following driving control. The target acceleration setting part increases the target deceleration of the vehicle according to increasing of a difference between the inter-vehicle distance and the target inter-vehicle distance. A deceleration correction part increases the target deceleration when a period during which the preceding vehicle has been continuously recognized is more than a predetermined period and the inter-vehicle distance is less than a predetermined distance.

14 Claims, 4 Drawing Sheets

(51) Int. Cl.
*G08G 1/16* (2006.01)
*B60W 30/09* (2012.01)
*G06K 9/00* (2006.01)
*G05D 1/02* (2020.01)
*G01S 13/931* (2020.01)
*G01S 13/58* (2006.01)
*B60W 30/165* (2020.01)
*G01S 13/72* (2006.01)
*G01S 7/41* (2006.01)
*G01S 13/42* (2006.01)

(52) U.S. Cl.
CPC ............ *G01S 13/58* (2013.01); *G01S 13/723* (2013.01); *G01S 13/931* (2013.01); *G05D 1/0246* (2013.01); *G06K 9/00805* (2013.01); *G08G 1/166* (2013.01); *B60T 2201/022* (2013.01); *B60W 2554/801* (2020.02); *B60W 2720/106* (2013.01); *G01S 13/42* (2013.01); *G01S 2013/9318* (2020.01); *G01S 2013/9319* (2020.01); *G01S 2013/9321* (2013.01); *G01S 2013/9325* (2013.01); *G01S 2013/93185* (2020.01); *G05D 2201/0213* (2013.01)

(56) References Cited

U.S. PATENT DOCUMENTS

| | | | | |
|---|---|---|---|---|
| 6,370,470 B1* | 4/2002 | Yamamura | ......... | B60K 31/0008 180/170 |
| 8,010,274 B2* | 8/2011 | Sawada | ..................... | B60T 7/22 701/78 |
| 8,103,424 B2* | 1/2012 | Isaji | .................... | B60K 31/0008 701/96 |
| 8,224,551 B2* | 7/2012 | Grolle | ..................... | B60W 10/06 701/301 |
| 8,311,720 B2* | 11/2012 | Pelosse | ..................... | B60W 30/16 123/349 |
| 8,359,150 B2* | 1/2013 | Kuze | ..................... | B60W 30/16 701/96 |
| 8,798,907 B2* | 8/2014 | Shida | ..................... | G01S 5/0072 701/301 |
| 8,972,147 B2* | 3/2015 | Taneyhill | ............ | B60K 31/0066 701/96 |
| 9,481,369 B2* | 11/2016 | Isogai | .................... | B60W 30/16 |
| 9,610,950 B2* | 4/2017 | Goto | ..................... | B60W 30/16 |
| 10,286,910 B2* | 5/2019 | Nagatsuka | ............ | B60W 10/04 |
| 10,369,998 B2* | 8/2019 | Kuszmaul | ............ | G01S 13/931 |
| 10,437,258 B2* | 10/2019 | Zhang | ..................... | B60W 50/16 |
| 10,493,988 B2* | 12/2019 | Liu | ....................... | B60W 30/16 |
| 2001/0039472 A1* | 11/2001 | Isogai | .................... | B60K 31/0008 701/96 |
| 2002/0026276 A1* | 2/2002 | Hattori | ...................... | B60T 7/22 701/96 |
| 2002/0152015 A1* | 10/2002 | Seto | .................... | G60K 31/0008 701/96 |
| 2005/0090950 A1* | 4/2005 | Sawamoto | ............. | G08G 1/166 701/23 |
| 2006/0025918 A1* | 2/2006 | Saeki | .................... | B60W 10/06 701/96 |
| 2006/0289216 A1* | 12/2006 | Kato | ......................... | B60T 7/22 180/169 |
| 2008/0109120 A1* | 5/2008 | Sawamoto | ............. | B60W 30/17 701/1 |
| 2009/0093938 A1* | 4/2009 | Isaji | ...................... | B60W 10/184 701/96 |
| 2009/0132142 A1* | 5/2009 | Nowak | .................. | B60W 30/16 701/93 |
| 2009/0164109 A1* | 6/2009 | Maruyama | ............. | G08G 1/166 701/116 |
| 2010/0094509 A1* | 4/2010 | Luke | ..................... | B60W 40/02 701/45 |
| 2012/0065863 A1* | 3/2012 | Takagi | .................. | B60W 30/14 701/96 |
| 2012/0123659 A1* | 5/2012 | Sato | .......................... | G08G 1/22 701/96 |
| 2012/0239268 A1* | 9/2012 | Chen | ..................... | B60W 30/17 701/96 |
| 2013/0124064 A1* | 5/2013 | Nemoto | ................. | B60W 30/16 701/96 |
| 2013/0144502 A1* | 6/2013 | Shida | ..................... | B60K 31/00 701/96 |
| 2013/0179379 A1* | 7/2013 | Kurumisawa | .......... | G06N 7/005 706/46 |
| 2014/0005906 A1* | 1/2014 | Pandita | ................. | B60W 40/04 701/96 |
| 2014/0292545 A1* | 10/2014 | Nemoto | ................. | G08G 1/017 340/988 |
| 2015/0015384 A1* | 1/2015 | Shima | ................. | B60W 30/095 340/435 |
| 2015/0081189 A1* | 3/2015 | Fairgrieve | ............. | B60W 30/16 701/96 |
| 2015/0197249 A1* | 7/2015 | Sakima | ............... | B60W 30/165 701/96 |
| 2015/0314790 A1* | 11/2015 | Deragarden | ........... | B60Q 9/008 703/8 |
| 2016/0297447 A1* | 10/2016 | Suzuki | ............ | B60W 30/18163 |
| 2017/0066443 A1* | 3/2017 | Kobayashi | ............ | B60W 30/16 |
| 2017/0225689 A1* | 8/2017 | Mukai | .................. | B60W 10/18 |
| 2017/0259822 A1* | 9/2017 | Schubert | ............. | B60W 30/143 |
| 2018/0037235 A1* | 2/2018 | Otake | ..................... | B60K 28/06 |
| 2018/0137763 A1* | 5/2018 | Derag Rden | ....... | B60W 30/165 |
| 2018/0188745 A1* | 7/2018 | Pilkington | ............ | G05D 1/0276 |

* cited by examiner

------ TARGET-FOLLOWING DRIVING DECELERATION CONTROL WITHOUT CORRECTION PROCESS

—— TARGET-FOLLOWING DRIVING DECELERATION CONTROL AFTER PERFORMING CORRECTION PROCESS

DRIVING CONTROL DEVICE

CROSS-REFERENCE TO RELATED APPLICATION

This application is related to and claims priority from Japanese Patent Application No. 2016-250803 filed on Dec. 26, 2016, the contents of which are hereby incorporated by reference.

BACKGROUND OF THE INVENTION

1. Field of the Invention

The present invention relates to driving control devices capable of controlling an own vehicle to follow a preceding vehicle which is driving on a drive lane in front of an own vehicle.

2. Description of the Related Art

There has been provided an adaptive cruise control (ACC) capable of detecting and selecting a preceding vehicle, which is driving on a drive lane in a forward direction, in other vehicles around an own vehicle, and of controlling then own vehicle to follow the selected preceding vehicle as a driving following target object. ACC performs acceleration control (i.e. acceleration and deceleration control) of the own vehicle so as to maintain an inter-vehicle distance between the own vehicle and the preceding vehicle. This control causes the own vehicle to follow the preceding vehicle while maintaining the inter-vehicle distance between the own vehicle and the preceding vehicle.

Because various types of vehicles have different braking response characteristics during braking operation, the ACC of the own vehicle may find it difficult to maintain the inter-vehicle distance between the own vehicle and a preceding vehicle within a predetermined distance, and to correctly follow the preceding vehicle when a rate of change of deceleration of the preceding vehicle becomes greater than a rate of change of deceleration of the own vehicle, where a deceleration corresponds to a negative value of an acceleration. In order to solve this drawback, Patent document 1, Japanese patent laid open publication No. JP 2012-035817, discloses a technique to vary a deceleration start timing to start the deceleration for the own vehicle on the basis of a rate of change of deceleration (or a deceleration jerk) of the preceding vehicle. This technique makes it possible for the own vehicle to perform safe deceleration considering the braking response characteristics of the preceding vehicle when the preceding vehicle is higher in braking response characteristics than the own vehicle while following the preceding vehicle.

When the technique disclosed in patent document 1 performs the target-following driving deceleration control for the own vehicle in a condition in which the rate of change of the deceleration (i.e. the deceleration jerk) of the own vehicle is smaller than the rate of change of deceleration (i.e. the deceleration jerk) of the preceding vehicle, the timing when the own vehicle starts to decelerate becomes advanced, i.e. forward at the timing when the preceding vehicle starts to decelerate. By the way, the technical term "jerk" is a derivative of acceleration, and refers to abrupt changes in acceleration. This would causes discomfort to the driver of the own vehicle because the own vehicle starts to decelerate at an excessively earlier timing relative to the timing when the preceding vehicle starts to decelerate.

SUMMARY

It is therefore desired to provide a driving control device capable of performing safe deceleration control and provide comfortable driving to a driver of an own vehicle even if an adaptive cruise control (ACC) of the own vehicle does not vary a deceleration start timing.

An exemplary embodiment provides a driving control device. The driving control device is mounted on an own vehicle. The own vehicle is equipped with an object detection part. The object detection part such as a radar device captures front view images including objects in front of the own vehicle. The driving control device has a computer system including a central processing unit. The computer system is configured to provide various functions, i.e. a target-following driving control part, an inter-vehicle distance acquiring part, a target acceleration setting part, a deceleration correction part, etc.

The target-following driving control part receives the front view images transmitted from the object detection part. The target-following driving control part extracts a target object from the front view images, and performs a target-following driving control for the target object. The inter-vehicle distance acquiring part acquires an inter-vehicle distance between the own vehicle and the target object which is the target of the target-following driving control. The target acceleration setting part determines a target acceleration of the own vehicle so as to maintain the inter-vehicle distance detected by the inter-vehicle distance acquiring part within a target inter-vehicle distance during the target-following driving control. The target acceleration setting part increases a target deceleration, which is the target acceleration of a negative value, according to increasing of a difference between the target inter-vehicle distance and the inter-vehicle distance acquired by the inter-vehicle distance acquiring part. The deceleration correction part increases the target deceleration detected by the target acceleration setting part when a period during which the target-following driving control part continuously recognizes the target object is more than a predetermined period and the inter-vehicle distance acquired by the inter-vehicle distance acquiring part is less than a predetermined distance.

During the period of the target-following driving control for the target object, i.e. a preceding vehicle in which the own vehicle follows the preceding vehicle, which is driving on a drive lane in front of the own vehicle, the driving control device determines a target acceleration (i.e. a target deceleration) so as to maintain the inter-vehicle distance between the own vehicle and the preceding vehicle within the target inter-vehicle distance.

When determining the target deceleration (as a negative value of the target acceleration), the driving control device more increases the target deceleration according to reduction of the difference between the inter-vehicle distance and the target inter-vehicle distance. The target deceleration corresponds to a negative value of the target acceleration of the own vehicle. The inter-vehicle distance is a distance between the own vehicle and the preceding vehicle. The deceleration is a positive value which corresponds to a negative value of the acceleration.

The driving control device increases the target deceleration according to a time elapse during the period in which the inter-vehicle distance between the own vehicle and the preceding vehicle reduces and the difference between the inter-vehicle distance and the target inter-vehicle distance increases. This vehicle speed control of increasing the brake force of the own vehicle due to the reduction of the inter-vehicle distance is referred to as the target-following driving deceleration control. That is, there is a possible case for the target-following driving deceleration control to causes discomfort to the driver of the own vehicle. In particular, this problem of causing discomfort to the driver of the own vehicle remarkably appears when the driving control device performs the target-following driving deceleration control when the inter-vehicle distance is less than the predetermined distance.

In order to solve the problem previously described, the driving control device according to the present invention has the deceleration correction part capable of correcting, i.e. increasing the target deceleration detected by the target acceleration setting part when the inter-vehicle distance acquired by the inter-vehicle distance acquiring part is less than the predetermined distance. This control makes it possible to reduce, to a minimum value at an earlier timing, the difference in deceleration between the own vehicle and the preceding vehicle as the target-following driving object when compared with a case in which the driving control device performs the target-following driving deceleration control.

As a result, even if the own vehicle starts to decelerate and performs the target-following driving deceleration control simultaneously, this makes it possible to suppress a degree to reduce the inter-vehicle distance between the own vehicle and the preceding vehicle from increasing, when compared with a case in which the driving control device performs the target-following driving deceleration control only. Further, it is possible to reduce the maximum value of the target deceleration. This control makes it possible to provide comfortable driving to the driver of the own vehicle when compared with the case in which the driving control device performs the target-following driving deceleration control only.

When the driving control device performs the target-following driving deceleration control, the target deceleration, which has been corrected by the deceleration correction part, becomes greater than the target deceleration. In addition, during the predetermined time period counted from the time when the own vehicle starts to decelerate, a larger braking force is generated in the own vehicle by this deceleration process when compared with a magnitude of the braking force generated during the target-following driving deceleration control. For this reason, it is undesirable to perform the target-following driving deceleration control for the preceding vehicle recognized as the target-following driving object. Accordingly, an additional condition is added so as to correctly perform the process of correcting the target is deceleration. The deceleration correction part reduces the target deceleration detected by the target acceleration setting part when a period during which the target-following driving control part follows and continuously recognizes the preceding vehicle is more than the predetermined period. This makes it possible for the deceleration correction part to correctly perform the correction process of correcting the target deceleration of the own vehicle for the preceding vehicle as the target of the target-following driving deceleration control.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
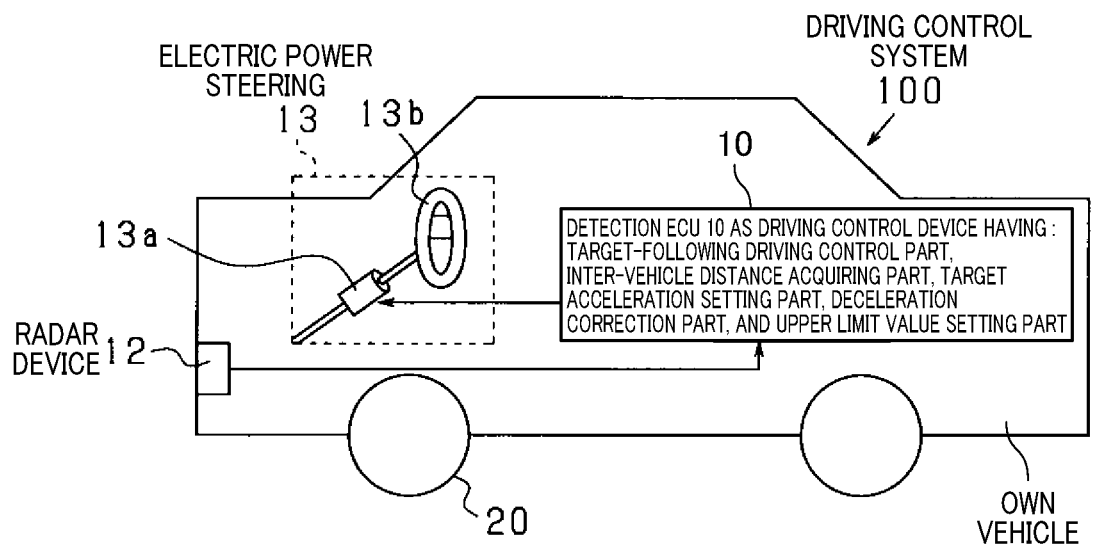
FIG. 1 is a view showing a schematic structure of a driving control system having a detection ECU 10 as a driving control device according to an exemplary embodiment of the present invention mounted on an own vehicle.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of the driving control device according to the exemplary embodiment of the present invention with reference to FIG. 1 to FIG. 5.

FIG. 1 is a view showing a schematic structure of a driving control system 100 equipped with a detection electronic control device (detection ECU) 10 as the driving control device according to the exemplary embodiment mounted on an own vehicle.

As shown in FIG. 1, the driving control system 100 is applied to the own vehicle with drive wheels 20. The rotation of the drive wheels 20 controls the own vehicle to move. The driving control system 100 has the detection ECU 10 and a radar device 12, an electric power steering 13, etc.

The radar device 12 is a known millimeter-wave radar capable of emitting high frequency waves within a millimeter wave band. The radar device 12 is mounted on a front end part of the own vehicle and detects a position of each of objects located within a predetermined detection angle. Specifically, the radar device 12 has plural antennas. The radar device 12 transmits detection waves every predetermined period, and the plural antennas receive reflection waves which have been reflected by objects.

The driving control device according to the exemplary embodiment calculates a distance between the own vehicle and a target object to be detected on the basis of a transmission time of detection waves and a receiving time of reflected waves. The driving control device according to the exemplary embodiment calculates a relative speed between the own vehicle and the target object such as a preceding vehicle on the basis of the reflected waves from the target object, frequencies of which have been changed by the Doppler effect. In addition, the driving control device according to the exemplary embodiment calculates an azimuth of the target object on the basis of a phase difference of the reflected waves received by the plural antennas of the radar device 12.

It is possible for the driving control device according to the exemplary embodiment to specify the relative position and the relative distance between the own vehicle and the target object on the basis of the position and azimuth of the target object. That is, the radar device 12 corresponds to an object detection part. The radar device 12 transmits detection waves, receives reflected waves every predetermined period, calculates a reflection position of the detection waves, i.e. a position of the target object, and calculates a relative speed between the own vehicle and the target object such as a preceding vehicle. The radar device 12 transmits the calculated reflection position and relative speed to the detection ECU 10.

The detection ECU 10 is connected to the radar device 12. The detection ECU 10 is a computer system having a central processing unit (CPU), a random access memory (RAM), a read only memory (ROM), an input/output interface (I/O), etc. The CPU executes programs stored in the ROM to realize various functions. For this reason, the detection ECU10 corresponds to a target-following driving control part, a inter-vehicle distance acquiring part, a target acceleration setting part, and a deceleration correction part.

The CPU in the detection ECU 10 executes a control program stored in the ROM in order to detect a preceding vehicle as a target object on the basis of object information detected by the radar device 12. The preceding vehicle is driving on an own drive lane of a roadway on which the own vehicle is also driving. During the radar device 12 captures the preceding vehicle, the CPU executes the control program so as to perform a predetermined target-following driving control for the target object. On the other hand, while the radar device 12 does not capture any preceding vehicle, the CPU in the detection ECU 10 performs the driving control so as to control the own vehicle to drive at a predetermined speed.

The execution of this control program recognizes one or more objects, as target-following driving objects detected by the radar device 12, which are present on the own drive lane (within a predetermined wide of the own vehicle). The execution of this control program adjusts a target acceleration of the own vehicle so as to maintains an inter-vehicle distance L between the own vehicle and the target-following driving object within a target inter-vehicle distance AL. The CPU in the detection ECU 10 adjusts the target acceleration of the own vehicle in order to maintain the inter-vehicle distance L within the target inter-vehicle distance AL. The target inter-vehicle distance AL varies due to a moving speed of the own vehicle. The CPU in the detection ECU 10 acquires the inter-vehicle distance L between the own vehicle and the target-following driving object on the basis of the object information detected by and transmitted from the radar device 12.

The CPU in the detection ECU 10 transmits control signals to an engine (not shown) and a brake device assembly (not shown) on the basis of a target acceleration, and performs a steering process control so as to adjust the moving direction of the own vehicle so as to control the own vehicle to follow the target-following driving object such as the preceding vehicle while accelerating/decelerating the own vehicle. Accordingly, the own vehicle is equipped with the electric power steering 13 which is driven by a steering instruction signal transmitted form the detection ECU 10.

The electric power steering 13 has a steering 13b and a steering motor 13a. The steering motor 13a generates a steering power (or a steering torque) so as to boost the steering power of the steering 13b. The larger the steering torque, the more the steering angle of the drive wheels 20 increase. In addition, the steering motor 13a generates a steering torque to operate the steering 13b when the own vehicle follows the preceding vehicle as the target object to be detected during the target-following driving control.

As previously described, while the CPU in the detection ECU 10 performs the target-following driving control so as to control the own vehicle to follow the preceding vehicle, the CPU determines a target acceleration of the own vehicle in order to maintain the inter-vehicle distance L between the own vehicle and the preceding vehicle as the target-following driving object within the target inter-vehicle distance AL. In the target-following driving control, when the CPU determines a target deceleration bt of the own vehicle as a negative target acceleration, the CPU calculates the target deceleration bt on the basis of the equation (1) as follows. The target deceleration bt is a negative acceleration represented by a positive value.

In the equation (1) (described below), K1 represents a relative distance gain, K2 indicates a relative speed gain, and Vr represents a relative speed between the own vehicle and the target-following driving object such as the preceding vehicle.

The detection ECU 10 stores in advance a first map in the ROM, for example. The first map represents a relationship between a speed of the own vehicle, the inter-vehicle distance L between the own vehicle and the target-following driving object, and the relative distance gain K1. Accordingly, the detection ECU 10 reads the first map and determines the relative distance gain K1 when determines the target deceleration bt.

Similarly, the detection ECU 10 stores in advance a second map in the ROM, for example. The second map represents a relationship between the speed of the own vehicle, the inter-vehicle distance L between the own vehicle and the target-following driving object, and the relative speed gain K2. Accordingly, the detection ECU 10 reads the second map and determines the relative speed gain K2 on the basis of the second map so as to determine the target deceleration bt.

$$\text{Target deceleration } bt = K1(AL-L) + K2 \times VR \qquad (1).$$

According to the equation (1), the greater a difference between the target inter-vehicle distance AL and the inter-vehicle distance L is, the higher the target deceleration bt is, where the inter-vehicle distance L is a difference between the own vehicle and the target-following driving object.

Figure 2:
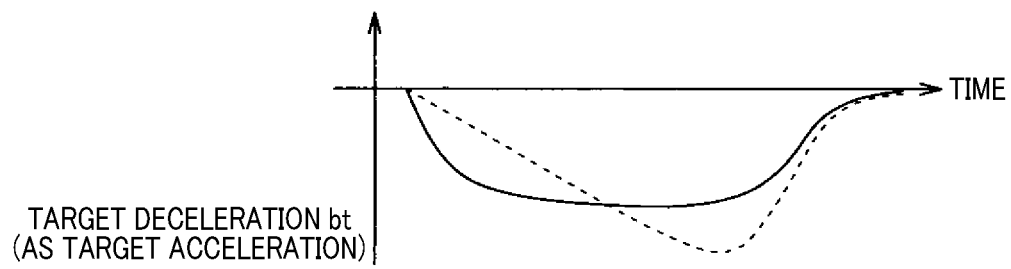
FIG. 2 is a view showing a difference between a target deceleration (obtained by performing a target-following driving deceleration control only) and a corrected target deceleration (obtained by performing both the target-following driving deceleration control and the correction process) performed by the detection ECU 10 as the driving control device according to the exemplary embodiment of the present invention.

FIG. 2 is a view showing a difference between a target deceleration (obtained by a target-following driving deceleration control) and a corrected target deceleration (obtained by the target-following driving deceleration control and a correction process). That is, the corrected target deceleration is obtained by correcting the target deceleration by a correction process performed by the detection ECU 10 as the driving control device according to the exemplary embodiment.

As shown in FIG. 2, the reducing of the inter-vehicle distance L between the own vehicle and the target-following driving object increases the target deceleration bt according to the time elapse in the period in which the difference between the inter-vehicle distance L and the target inter-vehicle distance AL is increased. Such deceleration control (hereinafter, referred to as the target-following driving deceleration control), which increases the braking force to the own vehicle according to the reduction of the inter-vehicle distance L causes discomfort to the driver of the own vehicle.

Figure 3:
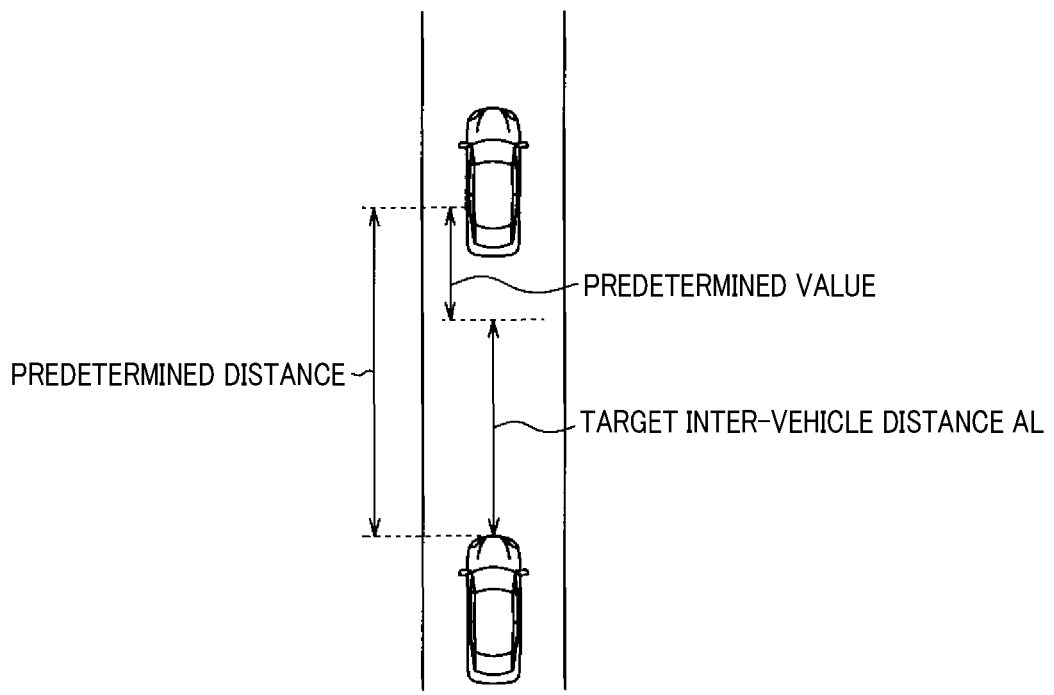
FIG. 3 is a view showing a predetermined distance to be maintained between the own vehicle and the preceding vehicle.

FIG. 3 is a view showing a predetermined distance to be maintained between the own vehicle and the preceding vehicle. In particular, the target-following driving deceleration control causes discomfort to the driver of the own vehicle when the CPU in the detection ECU 10 performs the target-following driving deceleration control in a situation in which the inter-vehicle distance L is less than the predetermined distance which is obtained by addition of the target inter-vehicle distance AL and a predetermined distance value, as shown in FIG. 3.

In order to avoid such discomfort for causing to the driver of the own vehicle, when the inter-vehicle distance L between the own vehicle and the target-following driving object is shorter than the predetermined distance, the detection ECU 10 multiplies the target deceleration bt calculated by using the equation (1) with a predetermine coefficient of more than 1 so as to correct the target deceleration bt more greatly. The detection ECU 10 determines this predetermined distance increasing according to increase of a relative deceleration of the target-following driving object to the own vehicle. The relative deceleration is a negative acceleration represented by a positive value.

When the relative deceleration of the target-following driving object to the own vehicle is less than a threshold value, it can be considered to reduce a degree of increasing the target deceleration bt which is necessary to maintain the inter-vehicle distance L between the own vehicle and the target-following driving object to the target inter-vehicle distance VL. Nevertheless, when the detection ECU 10 multiplies the target deceleration bt by the predetermined coefficient of more than 1 so as to increase the target deceleration bt, the magnitude of the deceleration of the own vehicle increases, and this causes discomfort to the driver of the own vehicle. In order to avoid this problem, the detection ECU 10 as the driving control device according to the exemplary embodiment uses the predetermine coefficient of 1 when the relative deceleration of the target-following driving object to the own vehicle is less than the threshold value.

As previously described, the detection ECU 10 performs the correction process only when the relative deceleration of the target-following driving object to the own vehicle is more than the threshold value. In this correction process, the detection ECU 10 multiplies the target deceleration bt by the predetermined coefficient. As expressed by the solid curve shown in FIG. 2, during a predetermined time period counted from a time when the own vehicle starts to decelerate, a large braking force is generated in the own vehicle when compared with the braking force during the target-following driving deceleration control. For this reason, it is undesirable for the detection ECU 10 to perform the correction process in the situation when the target-following driving control is not suitable for a preceding vehicle as the target-following driving object. Accordingly, it is necessary to use the condition in which the period during which an object as the target-following driving object has been continuously recognized as a target-following driving object becomes longer than the predetermined period in order to correctly perform the correction process. This makes it possible to correctly perform the deceleration control of the own vehicle to the object as the target-following driving object.

Figure 4:
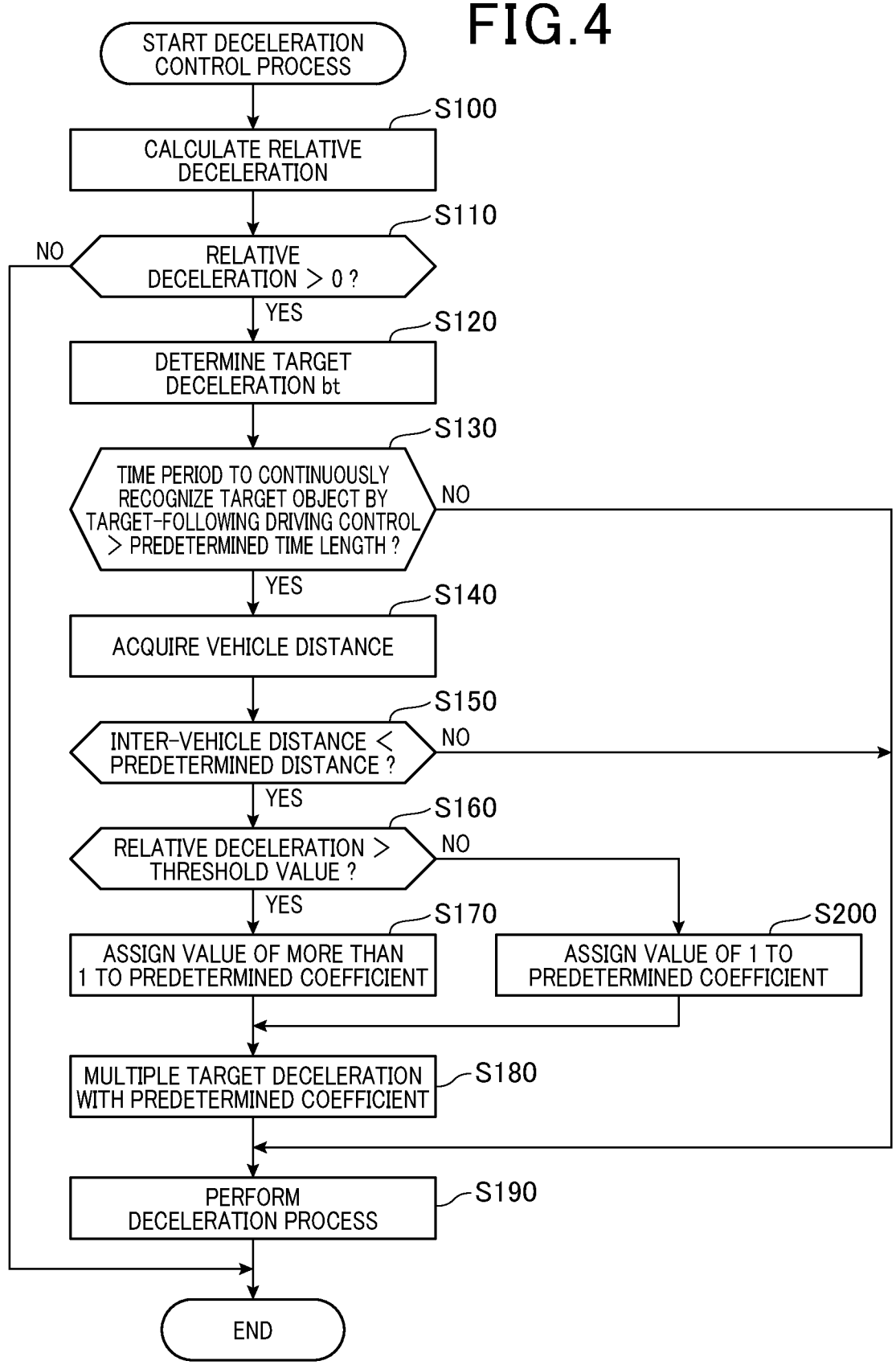
FIG. 4 is a view showing a flow chart of a deceleration control process performed by the detection ECU 10 as the driving control device according to the exemplary embodiment of the present invention.

FIG. 4 is a view showing a flow chart of the deceleration control process performed by the detection ECU 10 as the driving control device according to the exemplary embodiment. The detection ECU 10 repeatedly performs the deceleration control process shown in FIG. 4 every predetermined period.

In step S100 shown in FIG. 4, the detection ECU 10 calculates the relative deceleration of the target-following driving object to the own vehicle. For example, the target-following driving object is a preceding vehicle which is driving on a drive lane in front of the own vehicle. The operation flow progresses to step S110.

In step S110, the detection ECU 10 judges whether the relative deceleration calculated in step S100 is more than 0. When the judgment result in step S110 indicates negation ("NO" in step S110), i.e. indicates that the relative deceleration calculated in step S100 is not more than 0, the detection ECU 10 finishes the deceleration control process shown in FIG. 4.

On the other hand, when the judgment result in step S110 indicates affirmation ("YES" in step S110), i.e. indicates that the relative deceleration calculated in step S100 is more than 0, the operation flow progresses to step S120.

In step S120, the detection ECU 10 determines the target deceleration bt by using the equation (1) as previously described. The operation flow progresses to step S130.

In step S130, the detection ECU 10 detects whether the period during which the preceding vehicle has been continuously recognized as the target-following driving object is more than the predetermined period.

When the judgment result in step S130 indicates negation ("NO" in step S130), i.e. indicates that the period during which the preceding vehicle has been continuously recognized as the target-following driving object is not more than the predetermined period, the operation flow progresses to step S190.

On the other hand, when the judgment result in step S130 indicates affirmation ("YES" in step S130), i.e. indicates that the period during which the preceding vehicle has been continuously recognized as the target-following driving object is more than the predetermined period, the operation flow progresses to step S140.

In step S140, the detection ECU 10 as the inter-vehicle distance acquiring part acquires, i.e. calculates the inter-vehicle distance L between the own vehicle and the target-following driving object, i.e. the preceding vehicle. The operation flow progresses to step S150.

In step S150, the detection ECU 10 detects whether the inter-vehicle distance L calculated in step S140 is less than the predetermined distance.

When the detection result in step S150 indicates negation ("NO in step S150), i.e. indicates that the inter-vehicle distance L calculated in step S140 is not less than the predetermined distance, the operation flow progresses to step S190.

On the other hand, when the judgment result in step S150 indicates affirmation ("YES" in step S150), i.e. indicates that the inter-vehicle distance L calculated in step S140 is less than the predetermined distance, the operation flow progresses to step S160.

In step S160, the detection ECU 10 detects whether the relative deceleration of the target-following driving object to the own vehicle calculated in step S100 is more than the threshold value.

When the detection result in step S160 indicates affirmation ("YES" in step S160), i.e. indicates that the relative deceleration of the target-following driving object calculated in step S100 is more than the threshold value, the operation flow progresses to step S170.

In step S170, the detection ECU 10 assigns a value of more than 1 to the predetermined coefficient on the basis of the relative deceleration of the target-following driving object to the own vehicle calculated in step S100. The operation flow progresses to step S180.

On the other hand, when the detection result in step S160 indicates negation ("NO in step S150), i.e. indicates that the relative deceleration of the target-following driving object to the own vehicle calculated in step S100 is more than the threshold value, the operation flow progresses to step S200.

In step S200, the detection ECU 10 assigns the value of 1 to the predetermined coefficient. The operation flow progresses to step S180.

In step S180, the detection ECU 10 multiplies the target deceleration bt obtained in step S120 by the predetermined coefficient obtained in step S170 or in step S200 in order to correct the target deceleration bt. The operation flow progresses to step S190.

In step S190, the detection ECU 10 generates control signals on the basis of the target deceleration bt obtained in step S120 or the corrected target deceleration bt obtained in step S180, and transmits the generated control signals to the engine and brake device of the own vehicle so as to perform the deceleration control process of the own vehicle. The detection ECU 10 finishes the deceleration control process.

The driving control device according to the exemplary embodiment having the structure and actions previously described have the following effects.

When performing the deceleration control process shown in FIG. 4, the detection ECU 10 increases the target deceleration bt when the period during which the target-following driving object such as a preceding vehicle is continuously recognize becomes longer than the predetermined period and the inter-vehicle distance L between the own vehicle and the target-following driving object is less than the predetermined distance. This control process makes it possible to reduce the difference in deceleration between the own vehicle and the target-following driving object to be as small as possible at earlier timing when compared with a case in which the detection ECU 10 performs the target-following driving deceleration control only. As a result, in a case in which the detection ECU 10 instructs the own vehicle to start the deceleration at the same timing when performing the target-following driving deceleration control, it is possible for the detection ECU 10 to suppress a degree of reducing the inter-vehicle distance L between the own vehicle and the target-following driving object as small as possible when compared with the detection ECU 10 only performs the target-following driving deceleration control, and to reduce the maximum value of the target deceleration bt designated by the solid line shown in FIG. 2.

Further, as compared with the case in which the detection ECU 10 performs the detection ECU 10 designated by the dotted line shown in FIG. 2, the target-following driving deceleration control designated by the solid line suppresses the driver of the own vehicle from receiving discomfort.

The detection ECU 10 increases the predetermined coefficient according to increasing of the relative deceleration of the target-following driving object such as a preceding vehicle to the own vehicle. This control makes it possible to increase the target deceleration bt of the own vehicle when the own vehicle starts to decelerate according to increasing of the relative deceleration of the target-following driving object to the own vehicle. Further, it is possible for the detection ECU 10 to increase the target deceleration bt based on a difference between the deceleration of the target-following driving object and the deceleration of the own vehicle. This control makes it possible to avoid the case in which the inter-vehicle distance L becomes less than the target inter-vehicle distance AL.

When the relative deceleration of the target-following driving object such as a preceding vehicle to the own vehicle is less than the threshold value, the detection ECU 10 assigns the value of 1 to the predetermined coefficient. This makes it possible for the detection ECU 10 to use, as the target deceleration bt, the target deceleration bt to be used during the target-following driving deceleration control when the relative deceleration of the target-following driving object such as a preceding vehicle to the own vehicle is less than the threshold value. Because this can avoid the generation of a strong braking force in the own vehicle, the detection ECU 10 provides comfortable driving to the driver of the own vehicle.

The detection ECU 10 assigns the sum of the target inter-vehicle distance AL and the predetermined distance value to the predetermined distance. This controls the detection ECU 10 to perform the correction process for the target-following driving object which is present within the predetermined distance, it is possible to quickly increase the target deceleration bt when the inter-vehicle distance L becomes smaller than the target inter-vehicle distance AL. This control remarkably suppresses discomfort to the driver of the own vehicle from causing.

The concept of the present invention is not limited by the exemplary embodiment previously described. It is possible to have the following various modifications.

In the exemplary embodiment previously described, the radar device 12 detects various objects. However, the concept of the present invention is not limited by this. For example, it is possible to use an image sensor so as to capture a front image view in front of the own vehicle. There are various types of image sensors such as a charge coupled device (CCD) image sensor, a complementary metal oxide semiconductor (CMOS) image sensor; a monocular camera and a stereo camera using near-infrared camera, etc.

In the exemplary embodiment previously described, the detection ECU 10 determines the target deceleration bt on the basis of the equation (1). However, the concept of the present invention is not limited by this. For example, it is possible for the detection ECU 10 to determine the target deceleration bt on the basis of another method. It is possible for the detection ECU 10 to multiply the target deceleration bt obtained by another method by the predetermined coefficient so as to increase the target deceleration bt, and obtain the same effects.

In the exemplary embodiment previously described, the detection ECU 10 multiplies the target deceleration bt obtained by using the equation (1) with the predetermined distance value of not less than 1 so as to correct the target deceleration bt in the case when the inter-vehicle distance L between the own vehicle and the target-following driving object such as a preceding vehicle is less than the predetermined distance. However, the concept of the present invention is not limited by this. For example, it is possible for the detection ECU 10 to add a correction value of not less than 0 to the target deceleration bt, for example. This makes it possible to obtain the same effects of the exemplary embodiment previously described.

In the exemplary embodiment previously described, the detection ECU 10 assigns the value of 1 to the predetermined coefficient and to use the predetermined coefficient only when the relative deceleration of the target-following driving object to the own vehicle is less than the threshold value. However, the concept of the present invention is not limited by this. For example, it is possible for the detection ECU 10 to use a predetermined coefficient of more than 1 in a case when the relative deceleration of the target-following driving object to the own vehicle is less than the threshold value.

In the exemplary embodiment previously described, the detection ECU 10 increases the predetermined coefficient according to increasing of the relative deceleration of the target-following driving object to the own vehicle is less than the threshold value. However, the concept of the present invention is not limited by this. For example, it is possible for the detection ECU 10 to use the predetermined coefficient of a fixed value of more than 1.

In the exemplary embodiment previously described, the detection ECU 10 adds the threshold value to the target inter-vehicle distance AL, and uses this addition as the predetermined distance. However, the concept of the present invention is not limited by this. For example, it is possible for the detection ECU 10 to use the target inter-vehicle distance AL as the predetermined distance.

Figure 5:
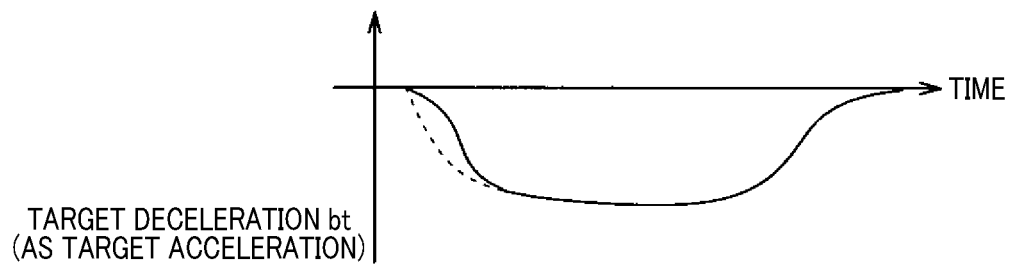
FIG. 5 is a view showing a variation of a target deceleration when the driving control device according to the exemplary embodiment performs a following driving deceleration control so as to limit a rate of change of the target deceleration to an upper limit value.

FIG. 5 is a view showing a variation of the target deceleration bt when the driving control device according to the exemplary embodiment performs the following driving deceleration control and a process of limiting a rate of change of the target deceleration bt to an upper limit value. That is, the detection ECU 10 uses the rate of change of the target deceleration bt (i.e. a change of the target deceleration bt) to the upper limit value.

In a case in which the detection ECU 10 performs, as the correction process, a process of adjusting a of the target deceleration bt to an upper limit value. The detection ECU 10 determines this upper limit value of the rate of change of the target deceleration bt, and performs the correction process using the determined upper limit value of the rate of change of the target deceleration bt. That is, the detection ECU 10 performs the correction process so as to remarkably correct the target deceleration bt, but does not directly correct the rate of change of the target deceleration bt.

Accordingly, as designated by the solid line shown in FIG. 5, it is possible for the detection ECU 10 to correctly perform the correction process when using the upper limit value of the rate of change of the target deceleration bt. The function of the detection ECU 10 performing the process of adjusting the rate of change of the target deceleration bt to the upper limit value corresponds to the upper limit value setting part.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A driving control device mounted on an own vehicle equipped with an object detection sensor capturing front view images including objects in front of the own vehicle, the driving control device comprising a computer system including a central processing unit, the computer system being configured to provide:
   a target-following driving control function receiving the front view images transmitted from the object detection sensor, the target-following driving control function recognizing, extracting and selecting a target object from the front view images, and performing a target-following driving control of the target object;
   an inter-vehicle distance acquiring function acquiring an inter-vehicle distance between the own vehicle and the target object;
   a target acceleration setting function determining a target acceleration of the own vehicle so as to maintain the inter-vehicle distance detected by the inter-vehicle distance acquiring function within a target inter-vehicle distance during a period of the target-following driving control, and the target acceleration setting function increasing a target deceleration, which is the target acceleration of a negative value, according to increasing of a difference between the target inter-vehicle distance and the inter-vehicle distance acquired by the inter-vehicle distance acquiring function, and
   a deceleration correction function increasing the target deceleration detected by the target acceleration setting function prior to deceleration of the own vehicle, in response to
      a period during which the target-following driving control function continuously recognizes the target object being more than a predetermined period, and
      the inter-vehicle distance acquired by the inter-vehicle distance acquiring function being less than a predetermined distance.

2. The driving control device according to claim 1, wherein the deceleration correction function multiplies the target deceleration determined by the target acceleration setting function by a predetermined coefficient of more than 1 in order to increase the target deceleration determined by the target acceleration setting function.

3. The driving control device according to claim 2, wherein the deceleration correction function increases the predetermined coefficient according to increasing of a relative deceleration of the target object to the own vehicle.

4. The driving control device according to claim 3, wherein the deceleration correction function uses the predetermined coefficient of 1 in response to the relative deceleration of the target object to the own vehicle being less than a threshold value.

5. The driving control device according to claim 1, wherein the predetermined distance used by the deceleration correction function is obtained by adding a predetermined distance value to the target inter-vehicle distance.

6. The driving control device according to claim 2, wherein the predetermined distance used by the deceleration correction function is obtained by adding a predetermined distance value to the target inter-vehicle distance.

7. The driving control device according to claim 3, wherein the predetermined distance used by the deceleration correction function is obtained by adding a predetermined distance value to the target inter-vehicle distance.

8. The driving control device according to claim 4, wherein the predetermined distance used by the deceleration correction function is obtained by adding a predetermined distance value to the target inter-vehicle distance.

9. The driving control device according to claim 1, further comprising an upper limit value setting function determines an upper limit value of a rate of change of the target deceleration, and limits the rate of change of the target deceleration to the upper limit value.

10. The driving control device according to claim 2, further comprising an upper limit value setting function determines an upper limit value of a rate of change of the target deceleration, and limits the rate of change of the target deceleration to the upper limit value.

11. The driving control device according to claim 3, further comprising an upper limit value setting function determines an upper limit value of a rate of change of the target deceleration, and limits the rate of change of the target deceleration to the upper limit value.

12. The driving control device according to claim 4, further comprising an upper limit value setting function determines an upper limit value of a rate of change of the target deceleration, and limits the rate of change of the target deceleration to the upper limit value.

13. The driving control device according to claim 5, further comprising an upper limit value setting function determines an upper limit value of a rate of change of the target deceleration, and limits the rate of change of the target deceleration to the upper limit value.

14. A computer-implemented method for controlling an own vehicle to follow a preceding vehicle, the own vehicle equipped with an object detection sensor that captures front view images including objects in front of the own vehicle, the method comprising:

receiving the front view images transmitted from the object detection sensor;

recognizing, extracting and selecting a target object from the front view images;

performing a target-following driving control of the target object;

acquiring an inter-vehicle distance between the own vehicle and the target object;

determining a target acceleration of the own vehicle so as to maintain the inter-vehicle distance within a target inter-vehicle distance during a period of the target-following driving control, and increasing a target deceleration, which is the target acceleration of a negative value, according to increasing of a difference between the target inter-vehicle distance and the inter-vehicle distance; and increasing the target deceleration prior to deceleration of the own vehicle, in response to:

a period during which the target object is continuously recognized being greater than a predetermined period; and the inter-vehicle distance being less than a predetermined distance.

* * * * *